United States Patent
An et al.

(10) Patent No.: US 6,694,368 B1
(45) Date of Patent: Feb. 17, 2004

(54) COMMUNICATION APPARATUS AND METHOD BETWEEN DISTRIBUTED OBJECTS

(75) Inventors: Sun Shin An, Seoul (KR); Sang Kyung Kim, Seoul (KR); Kyung Sup Sun, Taejeon (KR)

(73) Assignee: Korea Telecommunication Authority, Kyunggi-do (KR)

( * ) Notice: Subject to any disclaimer, the term of this patent is extended or adjusted under 35 U.S.C. 154(b) by 0 days.

(21) Appl. No.: 09/498,422

(22) Filed: Feb. 4, 2000

(30) Foreign Application Priority Data

Dec. 28, 1999 (KR) .............................................. 99-63415

(51) Int. Cl.⁷ ........................... G06F 15/16; G06F 9/00; G06F 9/46
(52) U.S. Cl. ...................... 709/227; 709/202; 709/228; 709/229; 709/230; 709/302; 709/303; 709/304
(58) Field of Search ................................. 709/201, 202, 709/203, 227, 228, 229, 230, 302, 303, 304, 305; 717/100, 106, 108, 116, 120

(56) References Cited

U.S. PATENT DOCUMENTS 5,822,585 A * 10/1998 Noble et al. ................. 709/202
5,920,718 A * 7/1999 Uczekaj et al. ............. 717/108
6,006,230 A * 12/1999 Ludwig et al. ............. 717/100

* cited by examiner

Primary Examiner—Zarni Maung
Assistant Examiner—Paul Kang
(74) Attorney, Agent, or Firm—Merchant & Gould, P.C.

(57) ABSTRACT

Disclosed is a communication apparatus between distributed objects comprising: a plurality of separate software buses adapted to determine whether or not a communication service of which function and property is provided in a distributed platform; a platform administrator adapted to build and administrate a communication architecture in the distributed platform; a bus manager adapted to manage both a standard of types of the plurality of software buses and a bus object instance in the distributed platform by a strategic plan and an instruction of the platform administrator; a bus trader adapted to provide a trade function through an interaction with the bus manager, and a client object and a server object of an application level; an object trader adapted to allow the client to dynamically find an appropriate server; a repository adapted to provide a function which stores persistently instance information and various types of the plurality of software buses; a bus adapter adapted to provide the client and server objects with an application programing interface (API) associated with a bus binding process for use of the distributed platform, and adapted to perform a necessary trade and the bus binding process through an interaction with the bus trader and the plurality of buses; and a bus factory adapted to create a bus object coinciding with the standard of types of the plurality of software buses.

25 Claims, 8 Drawing Sheets

```
<bidl_spec>            ::= <bus_template_header> <bus_template_description>
<bus_template_header>  ::= <bus_template_name_part>
<bus_template_description>  ::=
        <bus_context_spec_part> ";"<bus_interface_spec_part> <bus_property_spec_part> ";"
<bus_template_name_part>  ::= "bus_template"<identifier>";"
```

Fig.4a

```
<bus_context_spec_part>  ::= <bus_context_name_part>"{"<bus_context_spec>"}"
<bus_context_name_part>  ::= "bus_context" <identifier>
<bus_context_spec>       ::= <topology_spec>";"
<topology_spec>          ::= "("<topology_type_specifier>":" <topology_type>")"
<topology_type_specifier>  ::= "topology"
<topology_type>          ::= "ptp"
                           | "mp"
```

Fig.4b

```
<bus_property_spec_part> ::= <bus_property_name_part>"{"<bus_property_spec>"}"
<bus_property_name_part> ::= "bus_property" <identifier>
<bus_property_spec> ::=
        <access_control_dcl>";"<availability_dcl>";"{<other_property_dcl>";"}
<access_control_dcl> ::= "("<access_control_specifier>":"<access_control_list>")"
<access_control_specifier> ::= "access_ctrl"
<access_control_list> ::= <string_literal> {","<string_literal>}
<availability_dcl>   ::= "("<availability_type_specifier>":"<availability_type>")"
<availability_type_specifier> ::= "availability"
<availability_type>  ::= "cold_stby"
                       | "warm_stby"
                       | "hot_stby"
<other_property_dcl> ::= "("<property_type_specifier>":" <property_type>")"
<property_type>   ::= <string_literal>
```

Fig.4c

```
erface_spec_part>   ::= <op_bus_interface_spec>
                      | <st_bus_interface_spec><bus_int
```

Fig.4d

```
<op_bus_interface_spec>      ::= <op_bus_dcl><op_semantic_dcl>";"
<op_bus_dcl>         ::=
<op_bus_specifier> "{"<op_bus_spec>"}" ";" [<supporting_type_dcl>]

<op_semantic_dcl>            ::="("<op_semantic_type_specifier>":"<op_semantic_type>")"
<op_semantic_type_specifier> ::= "op_sem"
<op_semantic_type>   ::= "at_least_once"
                       | "best_effort"

<op_bus_specifier>           ::= "op_bus" <op_bus_name>
<op_bus_name>                ::= <identifier>
<op_bus_spec>    ::= <operation> {<op_member>}{<operation>{<op_member>}}
<operation>      ::= [<direction_specifier>] <op_specifier>
<direction_specifier> ::= "rev"
<op_specifier>   ::= "op" <op_name>";"
<op_name>        ::= <identifier>
<op_member>      ::=
        [<direction_specifier>] <op_member_type_specifier><member_name>";"
<op_member_type_spcifier>  ::= <simple_data_type_specifier>
                             | <constr_data_type_specifier>
                             | <sub_bus_type_specifier>
                             | <union_bus_type_specifier>
                             | <op_type_specifier>
<simple_data_type_specifier> ::= <integer_type>
                             | <char_type>
                             | <floating_pt_type>
                             | <octet_type>
                             | <boolean_type>
<constr_data_type_specifier> ::= <struct_type>
                             | <union_type>
                             | <enum_type>
<sub_bus_type_specifier>   ::= "sbustype" < op_bus_name>
<union_bus_type_specifier> ::= "ubustype" <op_bus_name>
<member_name>              ::= <identifier>
<supporting_type_dcl>      ::= {<sub_bus_type_dcl>|<union_bus_type_dcl>}
<sub_bus_type_dcl>         ::= <sub_bus_type_specifier>"{"<op_bus_spec>"}" ";"
<union_bus_type_dcl>       ::= <union_bus_type_specifier>"{"<union_member_list>"}" ";"
<union_member_list>        ::=<union_member> <union_member>{<union_member>}
<union_member>             ::= <sub_bus_type_specifier><member_name>
                             |<union_bus_type_specifier><member_name>";"
```

Fig.4e

```
<st_bus_interface_spec>   ::=<stqos_semantic_dcl>";"<stream_direction_dcl>";"<st_bus_dcl>";"

<stqos_semantic_dcl>          ::= "("<stqos_semantic_type_specifier>":"<stqos_semantic_type>")"
<stqos_semantic_type_specifier> ::= "stqos_sem"
<stqos_semantic_type>         ::= "guaranteed"
                                | "best_effort"
<stream_direction_dcl>        ::= "("<stream_direction_type_specifier>":"<stream_direction_type>")"
<stream_direction_type_specifier> ::= "st_dir"
<stream_direction_type>       ::= "uni_f"
                                | "uni_b"
                                | "bi"

<st_bus_dcl>       ::= <st_bus_specifier>"{"<st_bus_spec>"}"
<st_bus_specifier>           ::= "st_bus" <st_bus_name>
<st_bus_name>                ::= <identifier>
<st_bus_spec>                ::= <st_member>{<st_member>}
<st_member>    ::= <flow_role><flow_name>"(" <flow_type>")" ";" [<qos_dcl>]
<flow_role>    ::= "source"
                 | "sink"
<flow_name>    ::= <identifier>
<flow_type>    ::= "audio"
                 | "video"
                 | "animation"
<qos_dcl>      ::= "with" "("<qos_spec>")" ";"
<qos_spec>     ::=
         <qos_param_type>":"<qos_param_value>{,<qos_param_type> ":"<qos_param_value>}
<qos_param_type>   ::= <string_literal>
<qos_param_value>  ::= <string_literal>
```

Fig.4f

COMMUNICATION APPARATUS AND METHOD BETWEEN DISTRIBUTED OBJECTS

BACKGROUND OF THE INVENTION

1. Field of the Invention

The present invention relates to a communication apparatus and method between distributed objects, and more particularly to an apparatus for and method of creating and using a characteristic software bus depending on a communication pattern of correlated application objects upon communication between the correlated application objects in a distributed environment.

2. Description of the Related Art

A conventional Berkeley socket communication mechanism which is a method used in an initially distributed computing environment is now widely used in a field of a network programing.

Such a socket communication mechanism basically provides an Application Programing Interface (hereinbelow referred to as "API") which allows a distributed application program to be written by using a subordinate transport protocol such as TCP/IP protocol. This socket communication mechanism is also used as a communication interface of a transmission network supporting a high level communication service of a distributed platform kernel.

A socket refers to a network programing code for giving and taking request and responses of an application by using a subordinate transport protocol, but not a practical communication protocol.

The characteristic of the socket communication mechanism is that a network I/O through the socket is treated like an I/O for a file. The difference between the network I/O and file I/O is that the network I/O uses a socket descriptor and conceals concrete details for establishing connection a network by using a subordinate transport protocol through provision of an Application Programing Interface (API) from an user.

The distributed application written by using the above-mentioned conventional socket communication mechanism is written in such a fashion that it depends on the subordinate network protocol. Thus, the development of a socket-based distributed application involves following three disadvantages:

First, an application program code and a network transport code should be written according to a network transport protocol, respectively.

Second, during the development of the distributed application, network programing overheads according to an address or a call code for use of a process, etc. are great.

Third, if hosts have different data representation methods upon exchanging data among themselves, transmission of data becomes complex.

Meanwhile, in addition to the socket communication mechanism there is a communication method which is called a Remote Procedure Call (herein below referred to as "RPC"). The RPC refers to a communication technique which provides an application developer with transparency so that a call request for a remote system is treated like a call request for a local procedure.

The RPC allows communication between processes by borrowing a form of a conventional procedure call, and that a client calls a remote procedure is called a request and that a server returns as a result of the request call from the client is called a reply. In order to conserve representation and meaning of data in the course of exchanging the request and response messages, the RPC mechanism has a data representation standard for changing a parameter and a result of a procedure into a standardized form through a transmission network except for a request and response exchanging protocol.

The main characteristic of the RPC communication method is that all the network code portions are hidden in a stub procedure so that both a client and a server can be freed from details (unity of a socket, order of byte) of networking.

However, in a case where RPC-based distributed applications are developed, various particulars such as parameter transmitting method, a binding process, transport protocol, data representation, performance, security matters, etc. should be taken into consideration, unlike the local call. The RPC-based distributed applications have another problem of that, since they have been developed in such a fashion that they are dependent on a specific network interface, a transmission interface code should be corrected along with the development of new network transport technology.

There is also a communication method between distributed objects, which is a communication mechanism adapted to support a transparent interaction between objects for a subordinate environment in a distributed environment consisting of different types of computers. In the RPC communication method, process of a service is accomplished in another system after transferring the service to that system through a functional procedure orientation, whereas in the communication method between distributed objects, a service is supported by calling a method defined through an interface of an object encapsulating data and a method.

The use of a service of a remote object through the communication method between distributed objects requires only calling of a method defined through an interface of a server object thereof. A subordinate structure supporting the communication between distributed objects like in a case of the RPC communication method conceals details associated with call of a remote method so that only knowledge of interface of an object enables communication with any object. For the purpose of this, in definition of the object interface to be independent of environment and technology for implementation, it is required to use Interface Definition Language (IDL).

The IDL refers to an interface description language used independent of a programing language but not the programing language. Accordingly, the IDL is an indispensable element which overcomes heterogeneity of a network, an OS (operating System), a programming language and provides an identical interface type to all objects. All objects in a communication environment of distributed objects have an interface defined by IDL, and definition of each interface indicates a set of operations which are services performed through use of the interface.

In a Common Object Request Broker Architecture (hereinbelow, referred to as "CORBA") i.e., a standard of the distributed objects-between-communication method used most widely currently, request and response messages exchanged between objects are transmitted through an Object Request Broker (hereinbelow, referred to as "ORB"). Such a distributed objects-between-communication mechanism is called an object bus or a software bus. A client object in the CORBA uses the software bus by means of a static or dynamic interface call method through a stub automatically produced by a compiling process in the IDL.

However, since such a conventional distributed objects-between-communication method provides an unlimited communication which uses a single communication mechanism employing the ORB, it is impossible to effectively provide a distinct appropriate communication service depending on what kind an application is. In addition, such a conventional distributed objects-between-communication method has an insufficient process function for successive media, and does not support a variety of constructions for communication and types of communication in view of structure.

SUMMARY OF THE INVENTION

Therefore, the present invention has been made in view of the above-mentioned problems, and it is an object of the present invention to provide a communication apparatus and method between distributed objects in which characteristic software buses are used depending on a communication pattern of correlated application objects upon communication between the correlated application objects in a distributed environment.

It is another object of the invention to provide a communication apparatus and method between distributed objects in which free creation and operation of diverse communication patterns are supported so that communication relations between objects are dynamically managed and formed.

It is another object of the invention to provide a communication apparatus and method between distributed objects in which simplicity of the development of an application and increase in capacity of management can be promoted.

According to an aspect of the present invention, there is provided a communication apparatus between distributed objects comprising:

a plurality of separate software buses adapted to determine whether or not a communication service of which function and property are provided in a distributed platform;

a platform administrator adapted to build and to administrate a communication architecture in the distributed platform;

a bus manager adapted to manage both a standard of types of the plurality of software buses and a bus object instance in the distributed platform by a strategic plan and instruction of the platform administrator;

a bus trader adapted to provide a trade function through an interaction with the bus manager, and a client object and a server object of an application level;

an object trader adapted to allow the client to dynamically find an appropriate server;

a repository adapted to provide a function which stores persistently instance information and various types of the plurality of software buses;

a bus adapter adapted to provide the client and server objects with an application programing interface (API) associated with a bus binding process for use of the distributed platform and adapted to perform a necessary trade and the bus binding process through an interaction with the bus trader and plurality of buses; and a bus factory adapted to create a bus object coinciding with a standard type of the plurality of software buses.

According to another aspect of the present invention, there is also provided a communication method between distributed objects, comprising the steps of:

allowing a client to acquire both an identifier of a software bus and a reference of an object providing a service requested by the client;

binding the client to a desired software bus for a request of a call by the client;

allowing the client to request a service to the server through the software bus bound to the client;

allowing the server to register an object and the server to acquire a reference of a bus object created on the basis of a signature and a semantic property of interfaces which the server wants to provide;

binding the server to bus objects which the server wants to use by using the reference acquired in the preceding step;

allowing the server to receive parameters of the request and perform an implementation method thereof when a request of the service by the client is transmitted to the server through the software bus and to load an associated software bus with a return result of the implementation method if there is the return result of the implementation method; and allowing the client to receive a result for the request by the client object through the software bus.

BRIEF DESCRIPTION OF THE DRAWINGS

The foregoing and other objects, features and advantages of the present invention will become more apparent from the following detailed description when taken in conjunction with the accompanying drawings in which:

FIGS. 4a to 4f are views illustrating a bus interface definition language (BIDL) employed in an embodiment of the present invention.

DETAILED DESCRIPTION OF THE PREFERRED EMBODIMENT

Reference will now be made in detail to the preferred embodiments of the present invention.

The present invention provides a communication mechanism which integrates and supports diverse types and characteristics of communication in an interaction between distributed application objects in separate software buses. The interaction between distributed objects is carried out through an interface of a software bus predefined in a distributed platform.

Figure 1:
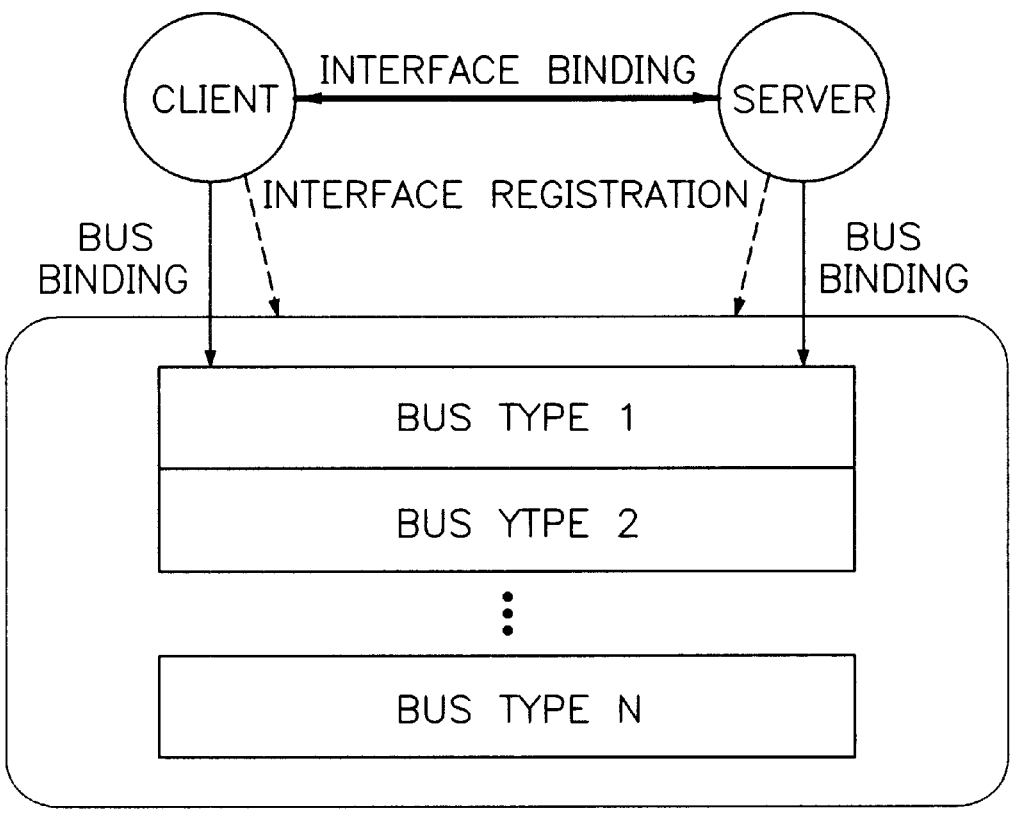
FIG. 1 is a schematic view illustrating an interaction between distributed objects by using an individual bus employed in an embodiment of the present invention.

FIG. 1 is a schematic view illustrating an interaction between distributed objects by using N separate buses employed in an embodiment of the present invention.

Referring to FIG. 1, the interaction between distributed objects includes a procedure of the following four steps:

A first step is to standardize in advance various types of software buses constituting a communication architecture of a distributed platform under the responsibility of a platform administration. Then, templates of the standardized various types of buses are stored in the distributed platform. A software bus requested by an application object is created by the distributed platform through the use of the templates. The types of software buses are standardized by a bus semantic property tree and Bus Interface Definition Language (BIDL). The type of each bus can vary with an applied communication environment or an application.

A second step in which an object interface is registered is that a server manager informs the distributed platform of the existence of an object and obtains an object reference, i.e., a wholly recognizable identifier. In this step, operations associated with registration of object type and instance are performed. The registration of the object type corresponds to that of an object schema, and the registration of the object instance corresponds to that of an object entity.

A third step is a process for binding with one of various types of buses constituted in the distributed platform, which an object wants to use is performed. The reason why the binding process is requested is that a plurality of bus objects exist in a subordinate platform. Therefore, it is always required to select a bus supporting a mechanism suitable for a communication property which objects want to use. The software bus determines whether or not communication between objects satisfies communication characteristics of the type and order of operation data, and Quality of Service (QoS) etc., supported by a bound bus. If the determining result is unsatisfactory, communication can't be accomplished.

A fourth step is in which a binding process of a client-server relationship for giving and taking a service through an interaction between objects bound with an identical bus is performed. A binding process between client-server objects (also called a service binding) means a combination of a peer-to-peer level of abstraction like a case of a conventional distributed platform, and represents more particularly an interaction of a call of an operation or transmission of streams, etc., through an application object interface.

Figure 2:
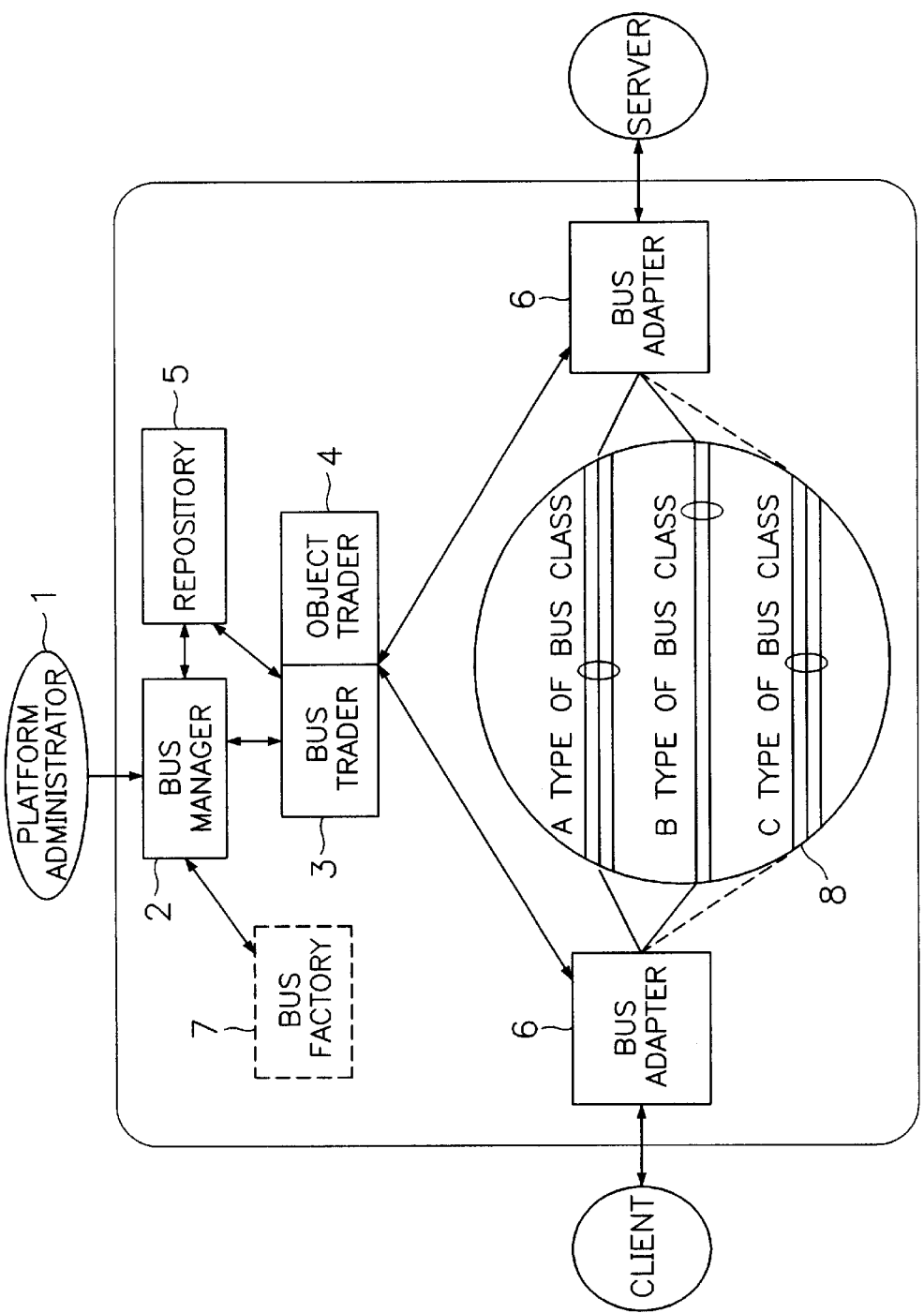
FIG. 2 is a schematic block diagram illustrating a plurality of constitutional elements each having a function necessary for an interaction between objects according to an embodiment of the present invention.

FIG. 2 is a schematic block diagram illustrating the construction of a platform including a plurality of functional elements necessary for an interaction between a client object and a server object through the platform employed in an embodiment of the present invention.

Referring to FIG. 2, there is shown a platform administrator 1 which is adapted to form and administrate a communication architecture within the platform through an interaction with a bus manager 2. The bus manager 2 is a module which performs a managerial function of both standard types of the plurality of software buses and a bus object instance in the distributed platform. The bus manager 2 provides an user interface for the platform administrator 1. Further, the bus manager 2 performs registration and withdrawal of the standard of types of the plurality of buses, creation and removal of a bus instance.

The bus manager 2 is also adapted to store and manage a standard for describing the types of the plurality of buses for registration and withdrawal of the standard of types of the plurality of buses. The bus manager 2 creates and manages an instance of a specific bus type by using as a template the standard of types of the plurality of buses stored in a repository 5. The bus manager 2 registers a created bus object through an interface of a bus trader 3. For the purpose of this, the bus manager 2 interacts with a bus trader 3 when a bus object is created and removed. The bus object is automatically registered in the bus trader when being created, and it is canceled from the bus trader when being removed. Information on a bus instance is stored and managed by using an implementing repository. The bus manager 2 is a means for implementing an architecture for a bus communication of an entire system level by a strategic plan and instruction of the platform administrator 1.

The bus trader 3 performs the same function as that of a general object trader acting as a broker for a bus object. That is, the bus trader 3 uses a value of the type characteristics and a search condition for the bus object when it regards a bus object as a server object to act to return a reference of a bus object satisfying the value of the type characteristics and the search condition for the bus object. The purpose that a bus trader object used only upon trading of a bus is prepared separately is to protect the bus trader object from general user objects and to formulate constraints or a strategic plan imposed on only the bus trader 3 through an interaction with the bus manager 2.

The bus trader 3 is adapted to provide a trade function through an interaction with the bus manager 2, and a client object and a server object of an application level. In this regard, the bus manager 2 performs an export function for advising the bus trader 3 of a service providing object (bus) and objects of the application level perform an import function for requesting information on a desired bus by using properties of buses.

An object trader 4, which is an object supporting a late binding process for a specific service, is also a platform server adapted to allow a service client to dynamically find an appropriate server. The object trader 4 has the same function as the bus trader 3 has but is an object providing a trade function for a general service object (a server of an application level). A trade service using the object trader 4 is usually used when determining a reference of a counter-part object on the basis of a function or characteristics of a service necessary for establishment of a client-server relationship between objects of the application level.

A repository 5 provides a function which stores persistently instance information and various types of buses. The repository is generally classified into a standard (or interface) repository which acts as a storage for storing a standard type of buses and an implementing repository which acts as a storage for storing information on an implementing object. The standard repository provides a service for storage and retrieval of information to an user object. In a practically implemented form, this server function may be replaced by using a directory system or a data base.

A bus adapter 6, which is a proxy object for executing vicariously the bus binding process between a client object and a server object, is adapted to provide the client and server objects with an application programing interface (API) associated with a bus binding process for use of the distributed platform, and is adapted to internally perform a necessary trade and the bus binding process through an interaction with the bus trader and the plurality of buses.

A bus factory 7 acts to create a bus object coinciding with the standard of types of the plurality of buses, and may be implemented with a module within the bus manager 2 or a separate object.

A software bus object 8 allows diverse object communication relationships such as an interaction pattern between distributed application objects, a topology, and the characteristics of quality of a service(QoS), etc., to be integrated into a subordinate communication mechanism so that the integrated diverse object communication relationships can be provided. The software bus is an element adapted to determine whether or not a communication service of which function and property is provided in a distributed platform.

Structural classification and representation of requests for a characterized software bus require a bus semantic property tree and bus interface definition language (BIDL).

Figure 3:
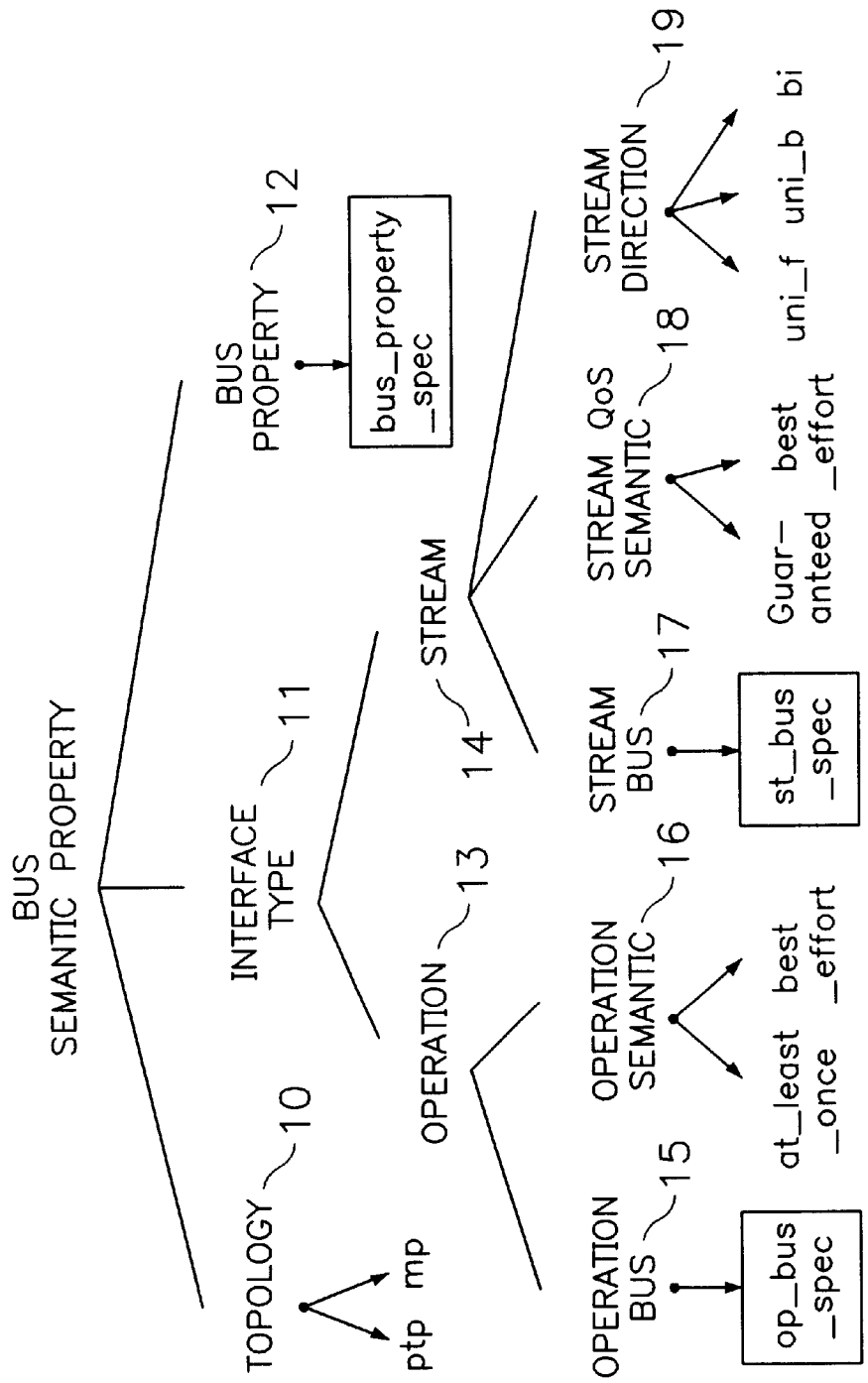
FIG. 3 is a view illustrating a bus semantic property tree employed in an embodiment of the present invention.

FIG. 3 is a view illustrating a bus semantic property tree employed in an embodiment of the present invention, in which a property and structure of a communication pattern to support through a bus are shown.

As shown in FIG. 3, the bus semantic property tree includes a top-down mode in which a superior property is divided into inferior detailed properties on the basis of a classification standard of the platform administrator 1, and a tree configuring method is as follows:

Each node of the bus semantic property tree has a name and represents a set of properties having an orthogonal or exclusive relationship to other nodes of an identical level.

A node of the bus semantic property tree is classified into non-leaf and leaf nodes. The non-leaf node has a child node of a superior property branched out into sub-properties, and the leaf node represents a node having a property no longer branched out into sub-properties. In view of a meaning of a property belonging to a node, the non-leaf node represents a set of properties, but the leaf node represents a separate property value.

The bus semantic property tree is largely classified into three viewpoints of a link configuration, an interaction style, and a service property in view of a property, and the meanings of each property node according to such three viewpoints are as follows:

First, the viewpoint of a link configuration is adapted to indicate a direction in which messages are exchanged between transmitting and receiving party objects in a connection shape configured through software buses. A property node belonging to such a viewpoint of the link configuration includes a topology property node.

The topology, which is a property reflecting a shape of end point-to-end point of the buses, has a sub-property of PTP(point-to-point) and MP(multipoint). Namely, from the viewpoint of the topology, the connection shape between users for communication with each other through the buses (communication links) is divided into bi-party and multi-party communication types.

The viewpoint of an interaction style is adapted to distinguish characteristics of an interaction interface generated through the software buses from a function (maintenance of a transport mechanism or a connection state) which should be supported internally for transmission of a message. A property node belonging to such a viewpoint of the interaction style includes an interface type property node.

A communication mechanism used in a distributed object environment is distinguished from an interaction interface of objects, and the interface type property is the most important property for identifying which kind of communication mechanism is used by objects. An interface type to which an object provides a service includes an operation interface 13 and a stream interface 14. The transmissions of operation data and stream data requires different communication mechanisms.

For a case of the operation interface 13 in an aspect of a transport mechanism, a parameter for an operation call is transported, and a mechanism in which the result of this is returned is requested. The operation interface 13 assumes a form of a discrete interaction. Meanwhile, the stream interface 14 requires a mechanism in which byte streams corresponding to a stream type are continuously transported.

A property of the operation interface 13 is branched out into two sub-properties consisting of an operation bus 15 and operation semantic 16.

The operation bus property 15 is adapted to describe a standard corresponding to an operation signature type. The operation signature includes a return type of an operation, an operation name, and an operation parameter. The return type of an operation represents a data type returned as a result of an operation, and the operation parameter has input and output modes and a data type.

The operation semantic property 16 represents a call property of an operation while representing only two properties upon occurrence of an obstacle in a system or a communication link of a distributed environment. When the obstacle occurs, the operation semantic property 16 represents at_least_once in case that it supports to have an at-least-once executing property, and represents best_effort in case that reliability of an executing property is not ensured.

The property represented in the stream interface 13 is branched out into three sub-properties consisting of a stream bus 17, a stream Quality of Service(QoS) semantic 18, and a stream direction 19.

The stream bus property 17 is adapted to describe a stream bus interface standard of an application level. The stream bus interface standard represents that a specific stream is composed of which media data. The parameters of the stream bus interface standard includes a media type, and a media format, etc. Quality of Service(QoS) property of a stream type is adapted to describe an end-to-end QoS standard, and concrete values of the stream QoS standard may include the values of a frame rate, a delay and a loss rate, etc.

The stream Quality of Service(QoS) semantic property 18 is adapted to represent a support policy for guaranteeing a stream QoS, which is branched out into a case (guaranteed) of guaranteeing the stream QoS in a subordinate structure (bus) and a case (best_effort) of not guaranteeing the stream QoS in a subordinate structure. According to a QoS supporting policy, a case of guaranteeing stochastically the stream QoS except for the above two cases may also have a property value.

The stream directional property 19, which is adapted to represent a direction of a stream data flow through software buses, is divided into unidirectional and bidirectional properties (bi). The unidirectional property is subdivided into a forward directional property (uni_f) and a backward directional property (uni_b) depending on a role of an user object. The forward directional property (uni_f) represents an unidirectional flow of a message from a client (source) end to a server (sink) end, whereas the backward directional property (uni_b) represents a unidirectional flow of a message from the server (sink) end to the client (source) end. The bidirectional property (bi) represents two unidirectional flows of a message.

A property node belonging to the service property viewpoint includes a bus property node branched out from the bus semantic property tree.

The service property viewpoint is adapted to represent the non-functional aspect of the software buses. A condition for additionally improving a function of the software buses or restricting the use of the software buses may also be incorporated in a category of the bus semantic property tree.

The bus property 12 is adapted to represent a property which is identical to the bus property in a functional aspect of the software buses but distinguished from the bus property in a non-functional aspect of the software buses. For example, a QoS property of the software buses can represent a reliability, a security, the cost of use, and restraints, etc. of the software buses. Each QoS property can be subdivided into concrete values for an associated QoS standard. In order to precisely define a sub-property of such a property node, the definition of a scope or a type of values which the sub-property can have should be first performed.

FIGS. 4a to 4f are a view illustrating the definition of a bus type property and detailed descriptions of a bus interface definition language (BIDL) for concrete details of an interface protocol employed in an embodiment of the present invention.

The grammar of the BIDL for describing an interface pattern of a software bus is defined by the following extension-typed BNF representing method. Among symbols used herein, "|" represents the selection of one among items, "{ }" represents zero or more repetitions, and "+" represents one or more repetitions. "[ ]" is a symbol that allows an optional representation according to circumstances, < > is a symbol that represents a non-terminal, and " " is a symbol that represents a keyword or a terminal.

FIG. 4a is a view illustrating detailed descriptions of a bus template syntax definition of the bus interface definition language (BIDL) employed in an embodiment of the present invention. A bus template standard described in the BIDL is called a BIDL standard (bidl_spec) or a BIDL file. The BIDL standard corresponds to a template definition section which consists of a template header section a template description section. The template header section is adapted to describe a name of a bus template, and the template description section includes three standards adapted to represent a semantic property of a bus.

FIG. 4b is a view illustrating detailed descriptions of a bus context standard section of the bus interface definition language (BIDL) employed in an embodiment of the present invention.

Referring to FIG. 4b, the bus context standard section is adapted to represent a topology property corresponding to context information which a type of the software bus has. A syntax structure definition part of the bus context standard section is configured of topology_spec, and represents a type of a property value defined in the bus semantic property tree.

FIG. 4c is a view illustrating detailed descriptions of a bus property standard section of the bus interface definition language (BIDL) employed in an embodiment of the present invention.

Referring to FIG. 4c, the bus property standard section is adapted to describe information on names and types of particulars corresponding to a non-functional service property of a bus type. The bus property standard section defines two properties of an access control (access_control) and availability and also defines "other_property" so as to define properties requested later. The access control is used as information for restricting an user accessible to a software bus, and a property value thereof is represented by using a literal string (string_literal). The availability defines a solution to a problem occurred when a platform provides a software bus.

FIG. 4d is a view illustrating detailed descriptions of a bus interface standard section of the bus interface definition language (BIDL) employed in an embodiment of the present invention.

Referring to FIG. 4d, the bus interface standard section includes a flexible structure which allows free representation of diverse communication patterns requested by users except for representation of a fixed communication pattern such as representation of the operation (stream) interface signature used conventionally. The software bus is basically classified into operation and stream buses in consideration of an interaction interface of an application object.

An operation signature used by an application object includes a name and parameter of an operation, and a result of an operation. In a software bus of the present invention, an operation used by the application object is modeled on a set of events of the software bus providing operation patterns. Therefore, an operation signature of an object can be described as a set of arrayed order of events generated through an interface of the software bus. The events generated through the software bus interface include transmission of messages to a software bus, and reception of messages from the software bus. Each message is represented as input/output directions to/from the software bus along with a pair of a name and type thereof.

FIG. 4e is a view illustrating detailed descriptions of an operation bus interface standard section of a bus interface standard section of the bus interface definition language (BIDL) employed in an embodiment of the present invention.

Referring to FIG. 4e, the bus interface standard section includes an operation bus interface standard section (<op_bus_interface_spec>) and a stream bus interface standard section. The operation bus interface standard section (<op_bus_interface_spec>) is divided into an operation bus declaration section (<op_bus_dcl>) and an operation semantic declaration section (<op_semantic_dcl>).

The operation bus declaration section (<op_bus_dcl>) largely consists of a header portion, a body portion and a trailer portion. The bus declaration header portion adapted to describe a name of a bus type is represented as <op_bus_specifier> in view of a syntax structure, and the body portion adapted to describe a pattern of the bus type is represented as "{"<op_bus_spec>"}" and defines concrete members of the bus type. The trailer portion is represented as <supporting_type_dcl> which is adapted to define a supporting type declaration necessary for description of a pattern of a bus type member having a nested or united structure existing as a subpattern within the body portion.

The operation semantic declaration section (<op_semantic_dcl>) has two property values as defined in the bus semantic property tree.

In FIG. 4e, an operation bus specifier <op_bus_specifier> consists of a type keyword "op_bus" and name <op_bus_name> for uniquely identifying a bus type thereof.

Since the name of a bus type is used when an instance is created in a bus type template, it is required to wholly identify the name of a bus type. The type keyword "op_bus" is a keyword for representing that the whole bus type declaration syntax is used as a main bus having a single type.

A body portion of a bus type declaration section includes a list of event members constituting a communication (interaction) pattern of a bus. Each event member has optionally a direction specifier (<direction_specifier>) which represents a direction toward a bus and an operation specifier (<op_specifier>) that is a standard type of the event members.

The direction specifier (<direction_specifier>) is used to indicate reception of an event of which a direction differs from that of a previous event in a bus. An initial event means an event of message transmission from a client that is a basic directional property to a bus. In this case, the direction specifier (<direction_specifier>) is omitted.

Since a present model of the bus is an operation bus, the list of event members constituting a communication pattern of the bus has at least one operation type member. The operation type member refers to a member of a bus pattern used for transferring of a name of a specific operation through the bus.

The remaining members constituting the bus pattern are consisted of a combination of an operation member, a data transmitting member, and a subpattern transmitting member. The bus may transmit several operation patterns, and a boundary between the operation patterns is defined on the basis of declaration of the operation type member. The boundary between the operation patterns ranges from after declaration of the operation type member to before declaration of the next operation type member.

When regarding a bus declaration syntax as a single structure, each member of the structure is identical to a type of an event occurred in a bus interface. Therefore, each member of the bus declaration syntax is described as a type specifier for representing the type of an event, and a name of a parameter of the event type like a member of a structure.

The events which can be occurred in the bus interface include events such as transmission of an operation name constituting a communication pattern (transmission of an operation member), transmission of operation data, and transmission of the alternative choices of a nested operation or a union operation. In order to represent theses kinds of events, three-type-specifiers except for a conventional parameter data type are added to a type specifier of a declaration syntax member.

In a syntax structure for describing a standard of the member type specifier, a property section <simple_data_type_specifier> for defining a type of operation data is adapted to represent a basic parameter data type (e.g. integer, char, floating, etc.), <constr_data_type_specifier> used as a data type of a C++ programming language is adapted to represent a structure data type (e.g. struct, union, enum, etc.).

For the transmission of the operation name, an extended operation type specifier <op_type_specifier> uses a keyword of "op" type, and the "op" type is regarded as a primitive type in a bus model. The "op" type as the primitive type has the same scope as an <identifier> or a domain of a parameter of the "op" type. Therefore, a string satisfying a general identifier rule may be a value of the "op" type parameter.

A member of a type template for representing the transmission event of the nested operation which should be performed within one communication pattern has a type specifier <sub_bus type specifier> of the member. This syntax structure is identical to a syntax structure having a member of another struct structure in a struct structure of the C++ programming language.

As defined in the foregoing, the bus type specifier is consisted of a keyword for representing a bus type and a name of the bus type, and in case of a member for representing the nested operation, a form of <sub_bus_type_specifier> functions as a type specifier. The only difference is that "sbustype" is used to represent a subpattern through a keyword. The bus type represented as "sbustype" in a member should comprise definition of the bus type in a support type section.

A member of a type template for representing an event transmitting one selected among the union operations has a type specifier <union_bus_type_specifier> of the member. This syntax structure is identical to a syntax structure as a member of a union structure in a struct structure of the C++ programming language. Like a syntax structure of a general bus type specifier, <union_bus_type_specifier> is consisted of a keyword of "ubustype" for representing a union operation bus type and name used as an identifier of a bus type thereof for representation of a member type. These two elements function as one type specifier. Like "sbustype" a bus member of the "ubustype" type should be defined in the support type section.

The communication pattern of a bus to be defined in the present invention includes a list of members. Among the members, there is a member (e.g. sbustype or ubustype member) forming one communication subpattern in itself. At this moment, since only a type name is described in a body portion, a declaration section storing definition of a pattern of the member type is necessary.

A supporting type declaration section <supporting_type_dcl> defining the type of the subpattern (a list of members) to support definition of a body type includes declaration of a communication pattern of bus type members consisting of member parameters of the body portion.

The process of converting the declaration of the subpattern into the list of memebers is repeated until the bus type is ultimately represented as only a list of members.

Through this process, one bus type declaration template is represented as a sequentially arranged set of an operation type generated in the bus interface and operation data type member.

FIG. 4f is a view illustrating detailed descriptions of a stream bus interface standard section of a bus interface standard section of the bus interface definition language (BIDL) employed in an embodiment of the present invention.

Referring to FIG. 4e, the bus interface standard section includes an operation bus interface standard section (<op_bus_interface_spec>) and stream bus interface standard section (<st_bus_interface_spec>). The stream bus interface standard section (<st_bus_interface_spec>) is divided into three sections consisting of a stream QoS semantic declaration section (<stqos_semantic_dcl>), a stream direction declaration section (<stream_direction_dcl>), and a stream bus declaration section (<st_bus dcl>).

The stream QoS semantic declaration section (<stqos_semantic_dcl>) and the stream direction declaration section (<stream_direction_dcl>) are adapted to define a type specifier and property values which the type has and have values as defined in the bus semantic property tree.

The stream bus declaration section (<st_bus_dcl>) largely contains header and body portions.

The bus declaration header portion adapted to describe a name of a bus type is represented as <st_bus_specifier> in view of a syntax structure, and the body portion adapted to describe a pattern of the bus type is represented as "{"<st_bus_spec>"}" and defines concrete members of the bus type.

A stream bus specifier <st_bus_specifier> consists of a type keyword "st_bus" and name "st_bus_name" for uniquely identifying a bus type thereof.

The body portion of a bus type declaration section includes a list of event members representative of a stream property of a bus. Each event member represents one stream flow which has three types including audio, video, and animation. Each flow necessarily has a property <flow_role> for representing a direction in which a flow toward a bus has a value of "source" and a flow toward an application object from the bus has a value of "sink".

The purpose of defining a QoS declaration section is to represent a QoS property of a flow. At this time, property values thereof are defined as a literal string (string_literal) for a later extension.

In order to provide communication among application objects by using the above-mentioned software bus, an interaction among functional elements of various distributed platforms is necessary.

Figure 5:
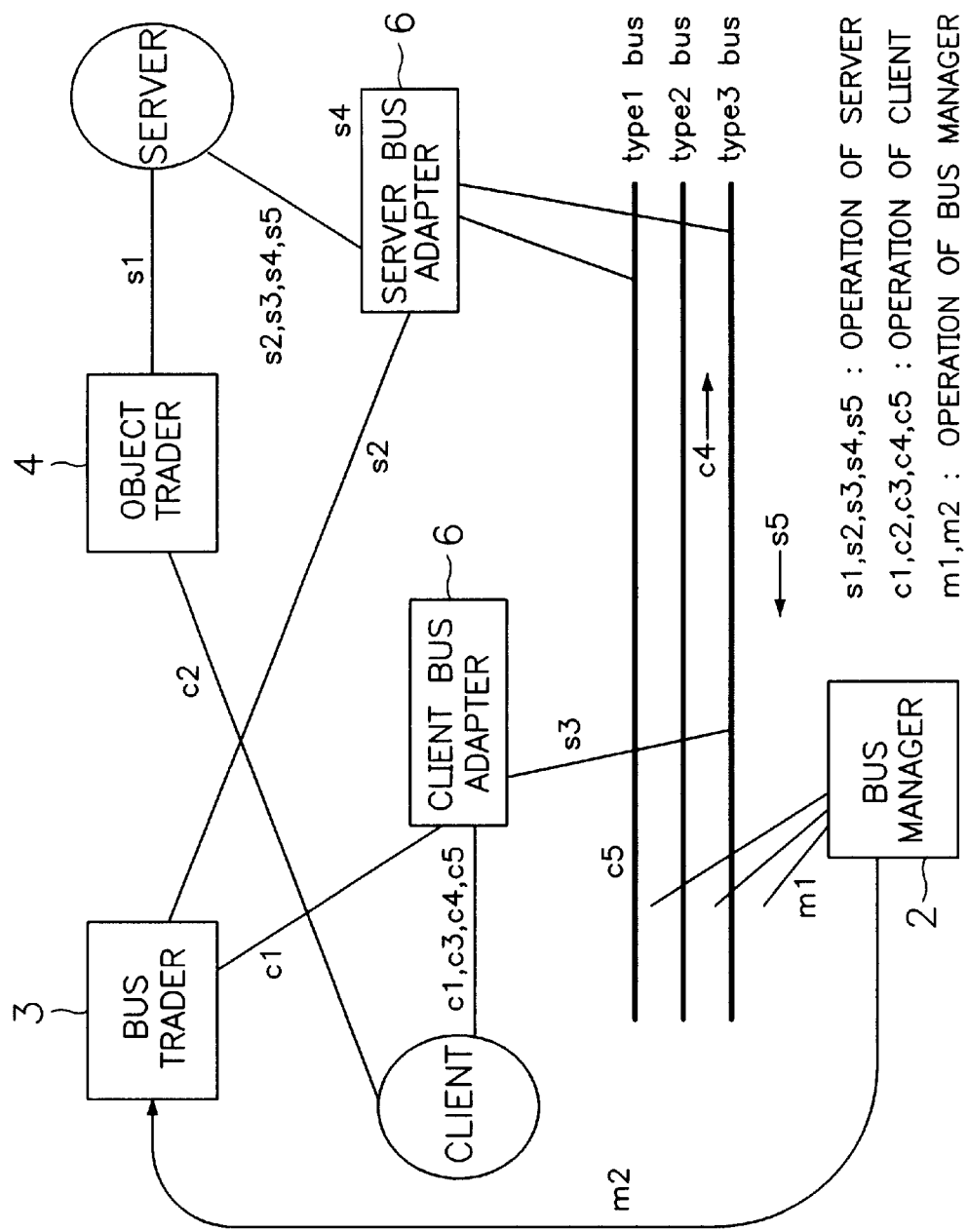
FIG. 5 is a view illustrating the communication operation between distributed objects according to an embodiment of the present invention.

FIG. 5 is a view illustrating an interaction between each constitutional element for communication between distributed objects according to an embodiment of the present invention.

The operation of a bus manager 2 will be described hereinafter with reference to FIG. 5.

The bus manager 2 stores and manages information on a bus type represented by a bus standard or a predefined representation method. The bus manager 2 also creates an instance object thereof (step m1) and registers the created bus object in a bus trader 3 through an import operation to bind a client object and a server object (step m2).

To describe the operation of a server, when the server wants to provide a service to clients, the server registers an object through an object trader 4 (step s1). The server acquires a reference of a bus object created on the basis of a signature and semantic property of interfaces which the server wants to provide through the bus trader 3 by way of a bus adapter of a server side 6 (step s2). The bus adapter of a server side 6 prepares for provision of a service to the client by using the reference acquired in the step (s2) so as to bind the server 6 to bus objects which the server wants to use (step s3). Then, when a request is transmitted to the server through the bus objects, the server receives parameters of the request and performs an implementation method thereof (step s4). If there is a return result of the implementation method, the server loads the bus with the return result (step st5).

To describe the operation of a client, the client acquires an identifier of a bus object created on the basis of a signature of interfaces of the client object through the bus trader 3 by way of a bus adapter of a client side 6 (step c1). The client acquires a reference of an object providing a service requested by the client through the object trader 4 (step c2). Then, the client is bound to a desired software bus through the client bus adapter 6 for a request of a call by the client (step c3). The client requests a service to the server through the software bus bound to the client (step c4). The client receives a result for the request by the client object through the software bus (c5).

As can be seen from the foregoing, according to the present invention, diverse types of communication of an interaction between distributed objects are distinguished in a distributed platform, and these characteristics are integrated to a subordinate communication mechanism, thereby promoting simplicity of the development of an application and increasing a capacity of management.

Provision of a communication service improved in view of management increases stability and reliability of the entire distributed system. Further, a communication architecture necessary for a distributed application in an info-communication network is built and managed dynamically, thereby efficiently supporting introduction of a new communication service and control of a distributed software module.

While this invention has been described in connection with what is presently considered to be the most practical and preferred embodiment, it is to be understood that the invention is not limited to the disclosed embodiment, but, on the contrary, it is intended to cover various modifications within the spirit and scope of the appended claims.

What is claimed is:

1. A communication apparatus between distributed objects comprising:
   a plurality of separate software buses adapted to determine whether or not a communication service of which function and property are provided in a distributed platform;
   a platform administrator adapted to build and to administrate a communication architecture in the distributed platform;
   a bus manager adapted to manage both a standard of types of the plurality of software buses and a bus object instance in the distributed platform by a strategic plan and instruction of the platform administrator;
   a bus trader adapted to provide a trade function through an interaction with the bus manager, and a client object and a server object of an application level;
   an object trader adapted to allow the client to dynamically find an appropriate server;
   a repository adapted to provide a function which stores persistently instance information and various types of the plurality of software buses;
   a bus adapter adapted to provide the client and server objects with an application programing interface (API) associated with a bus binding process for use of the distributed platform and adapted to perform a necessary trade and the bus binding process through an interaction with the bus trader and the plurality of buses; and
   a bus factory adapted to create a bus object coinciding with the standard of types of the plurality of software buses.

2. The communication apparatus according to claim 1, wherein the platform administrator standardizes previously various types of software buses constituting a communication architecture of a distributed platform, and stores templates of the standardized various types of software buses in the distributed platform.

3. The communication apparatus according to claim 2, wherein the software bus requested by an application object is created by the distributed platform through the use of the templates.

4. The communication apparatus according to claim 3, wherein the types of software buses are standardized by a bus semantic property tree and a Bus Interface Definition Language (BIDL).

5. The communication apparatus according to claim 4, wherein the bus semantic property tree is classified into a viewpoint of a link configuration for indicating a direction in which messages are exchanged between a transmitting party object and a receiving party object in a connection shape configured through the software buses, a viewpoint of an interaction style for distinguishing characteristics of an interaction interface generated through the software buses from a function which should be supported internally for transmission of a message, and a viewpoint of a service property for representing the non-functional aspect of the software buses.

6. The communication apparatus according to claim 5 wherein, the property node belonging to the link configuration viewpoint includes a topology property node which reflects a shape of end point-to-end point of the buses and has sub-properties of PTP(point-to-point) and MP(multipoint).

7. The communication apparatus according to claim 5, wherein the property node belonging to the interaction style viewpoint includes an interface type property node for identifying which kind of communication mechanism is used by objects.

8. The communication apparatus according to claim 7, wherein the interface type property node comprises:
   an operation interface property node branched out into two sub-properties consisting of an operation bus property adapted to describe a standard corresponding to an operation signature type, and an operation semantic property adapted to represent a call property of an operation while representing only two properties upon occurrence of an obstacle in a system or a communication link of a distributed environment; and
   a stream interface property node branched out into three sub-properties consisting of a stream bus property adapted to describe a stream bus interface standard of an application level, a stream Quality of Service(QoS) semantic property adapted to represent a support policy for guaranteeing a stream Quality of Service(QoS), and a stream direction adapted to represent a direction of a stream data flow through software buses.

9. The communication apparatus according to claim 5, wherein the property node belonging to the service property viewpoint comprises a bus property node for representing a property distinguished in the non-functional aspect of the software buses.

10. The communication apparatus according to claim 4, wherein the bus interface definition language (BIDL) comprises:
   a bus template syntax definition section which consists of a template header section adapted to describe a name of a bus template and a template description section adapted to represent a semantic property of a software bus;
   a bus context standard section bus adapted to represent a topology property corresponding to context information of a bus type;
   a bus property standard section adapted to describe information on names and types of particulars corresponding to a non-functional service property of a bus type; and
   a bus interface standard section adapted to freely represent diverse communication patterns requested by users.

11. The communication apparatus according to claim 10, wherein the bus interface standard section comprises an operation bus interface standard section and a stream bus interface standard section, the operation bus interface standard section including an operation bus declaration section consisting of a header portion adapted to describe a name of a bus type, a body portion adapted to define concrete members of the bus type and a trailer portion adapted to define a supporting type declaration necessary for description of a pattern of a bus type member existing as a subpattern within the body portion, and an operation semantic declaration section having two property values as defined in the bus semantic property tree, and the stream bus interface standard section including a stream Quality of Service (QoS) semantic declaration section, a stream direction declaration section, and a stream bus declaration section consisting of a header portion adapted to describe a name of a bus type and a body portion adapted to define concrete members of the bus type, the stream QoS semantic declaration section and the stream direction declaration section adapted to define property values of a type specifier and the type.

12. The communication apparatus according to claim 11, wherein the body portion of a bus type declaration section includes a list of event members representative of a stream property of a bus.

13. The communication apparatus according to claim 12, wherein each event member represents one stream flow having audio/video/animation types.

14. A communication method between distributed objects, comprising the steps of:
   allowing a client to acquire both an identifier of a software bus and a reference of an object providing a service requested by the client;
   binding the client to a desired software bus for a request of a call by the client;
   allowing the client to request a service to the server through the software bus bound to the client;
   allowing the server to register an object and the server to acquire a reference of a bus object created on the basis of a signature and a semantic property of interfaces which the server wants to provide;
   binding the server to bus objects which the server wants to use by using the reference acquired in the preceding step;
   allowing the server to receive parameters of the request and perform an implementation method thereof when a request of the service by the client is transmitted to the server through the software bus and to load an associated software bus with a return result of the implementation method if there is the return result of the implementation method; and
   allowing the client to receive a result for the request by the client object through the software bus.

15. The communication method according to claim 14, wherein the software buses are standardized previously, and templates of the standardized software buses are stored in a distributed platform.

16. The communication method according to claim 15, wherein the types of software buses are standardized by a bus semantic property tree and Bus Interface Definition Language (BIDL).

17. The communication method according to claim 16, wherein the bus semantic property tree is classified into a viewpoint of a link configuration for indicating a direction in which messages are exchanged between a transmitting party object and a receiving party object in a connection shape configured through the software buses, a viewpoint of an interaction style for distinguishing characteristics of an interaction interface generated through the software buses from a function which should be supported internally for transmission of a message, and a viewpoint of a service property for representing the non-functional aspect of the software buses.

18. The communication method according to claim 17 wherein, the property node belonging to the link configuration viewpoint includes a topology property node which reflects a shape of end point-to-end point of the buses and has sub-properties of PTP(point-to-point) and MP(multipoint).

19. The communication method according to claim 17, wherein the property node belonging to the interaction style viewpoint includes an interface type property node for identifying which kind of communication mechanism is used by objects.

20. The communication method according to claim 19, wherein the interface type property node comprises:
   an operation interface property node branched out into two sub-properties consisting of an operation bus property adapted to describe a standard corresponding to an operation signature type, and an operation semantic property adapted to represent a call property of an operation while representing only two properties upon occurrence of an obstacle in a system or a communication link of a distributed environment; and a stream interface property node branched out into three sub-properties consisting of a stream bus property adapted to describe a stream bus interface standard of an application level, a stream Quality of Service(QoS) semantic property adapted to represent a support policy for guaranteeing a stream Quality of Service(QoS), and a stream direction adapted to represent a direction of a stream data flow through software buses.

21. The communication method according to claim 17, wherein the property node belonging to the service property viewpoint comprises a bus property node for representing a property distinguished in the non-functional aspect of the software buses.

22. The communication method according to claim 16, wherein the bus interface definition language (BIDL) comprises:

a bus template syntax definition section which consists of a template header section adapted to describe a name of a bus template and a template description section adapted to represent a semantic property of a software bus;

a bus context standard section bus adapted to represent a topology property corresponding to context information of a bus type;

a bus property standard section adapted to describe information on names and types of particulars corresponding to a non-functional service property of a bus type; and a bus interface standard section adapted to freely represent diverse communication patterns requested by users.

23. The communication method according to claim 22, wherein the bus interface standard section comprises an operation bus interface standard section and a stream bus interface standard section, the operation bus interface standard section including an operation bus declaration section consisting of a header portion adapted to describe a name of a bus type, a body portion adapted to define concrete members of the bus type and a trailer portion adapted to define a supporting type declaration necessary for description of a pattern of a bus type member existing as a subpattern within the body portion, and an operation semantic declaration section having two property values as defined in the bus semantic property tree, and the stream bus interface standard section including a stream Quality of Service (QoS) semantic declaration section, a stream direction declaration section, and a stream bus declaration section consisting of a header portion adapted to describe a name of a bus type and a body portion adapted to define concrete members of the bus type, the stream QoS semantic declaration section and the stream direction declaration section adapted to define property values of a type specifier and the type.

24. The communication method according to claim 23, wherein the body portion of a bus type declaration section includes a list of event members representing a stream property of a bus.

25. The communication method according to claim 24, wherein each event member represents a stream flow having audio/video/animation types.

* * * * *